March 25, 1958 G. B. HILL 2,827,754
ROTARY RAKE WHEEL SIDE DELIVERY RAKE WITH
A POSITIVE DRIVE THEREFOR
Filed May 11, 1954 5 Sheets-Sheet 2
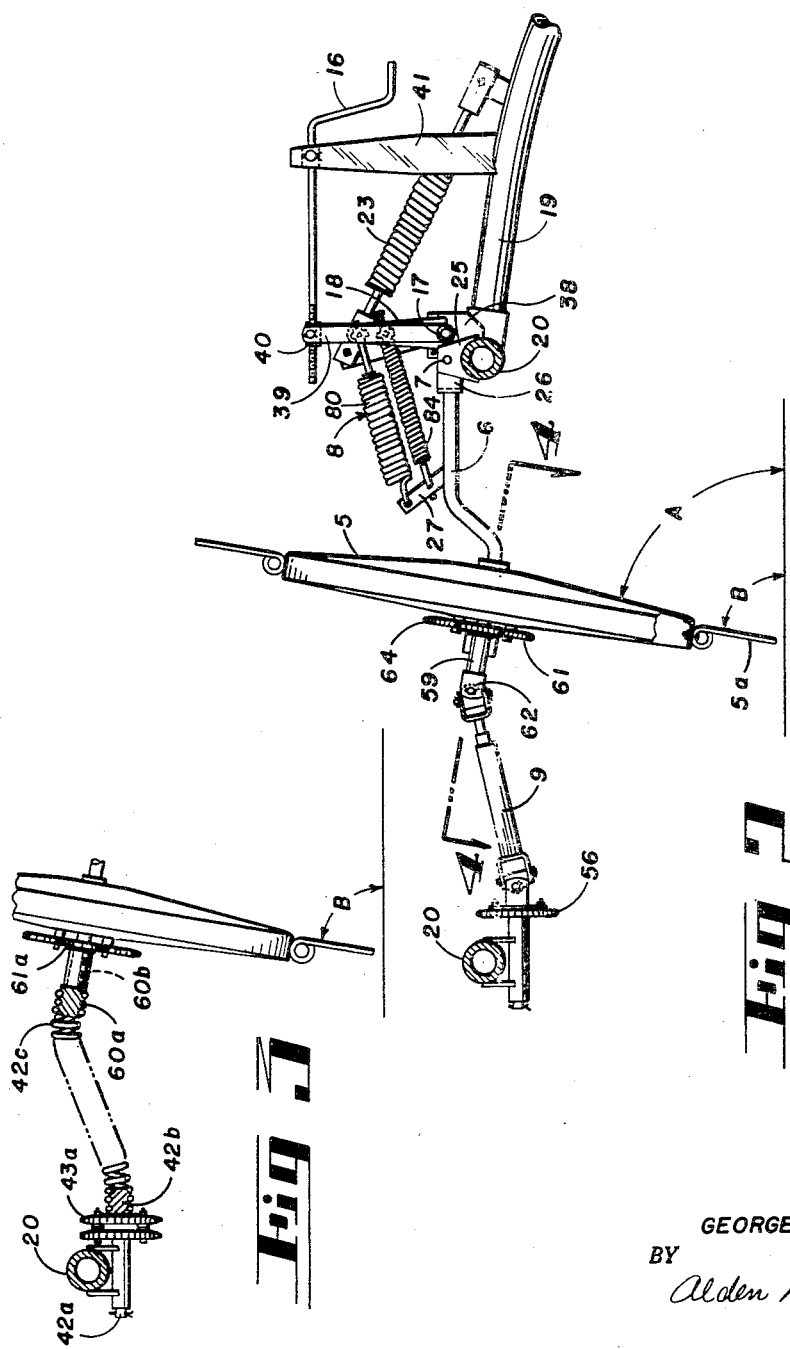
INVENTOR.
GEORGE B. HILL.
BY
Alden D. Redfield
ATTORNEY.

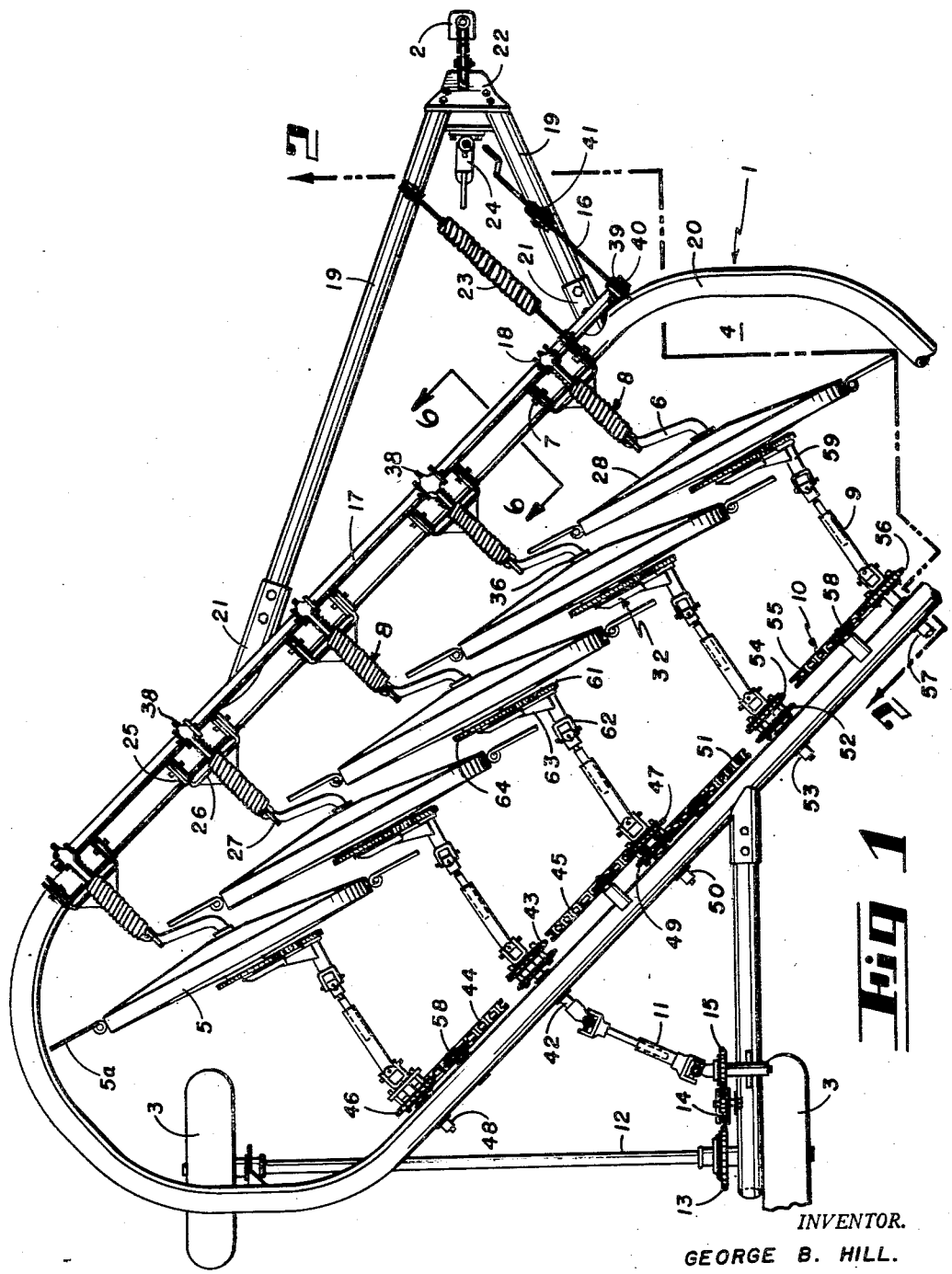

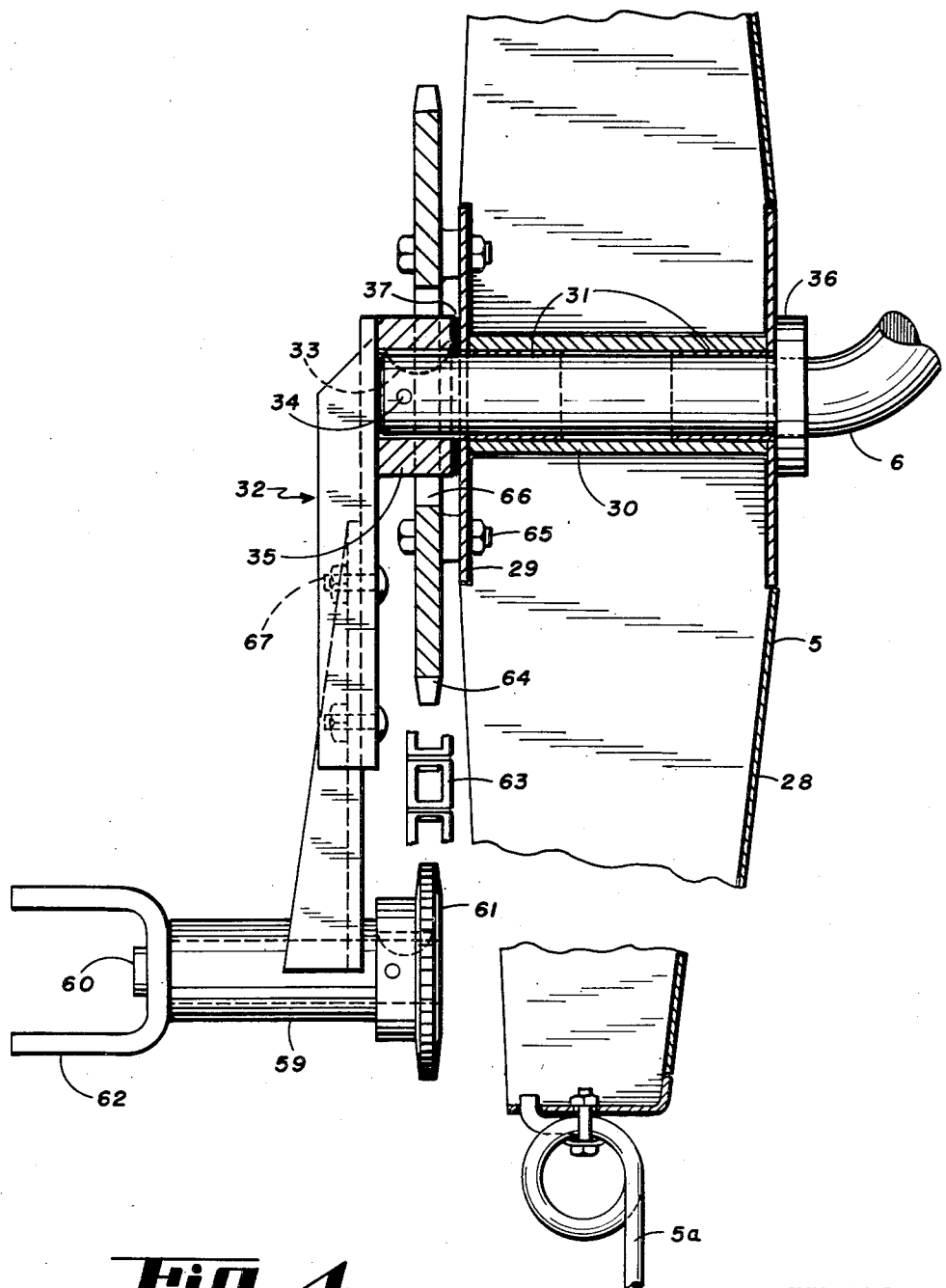

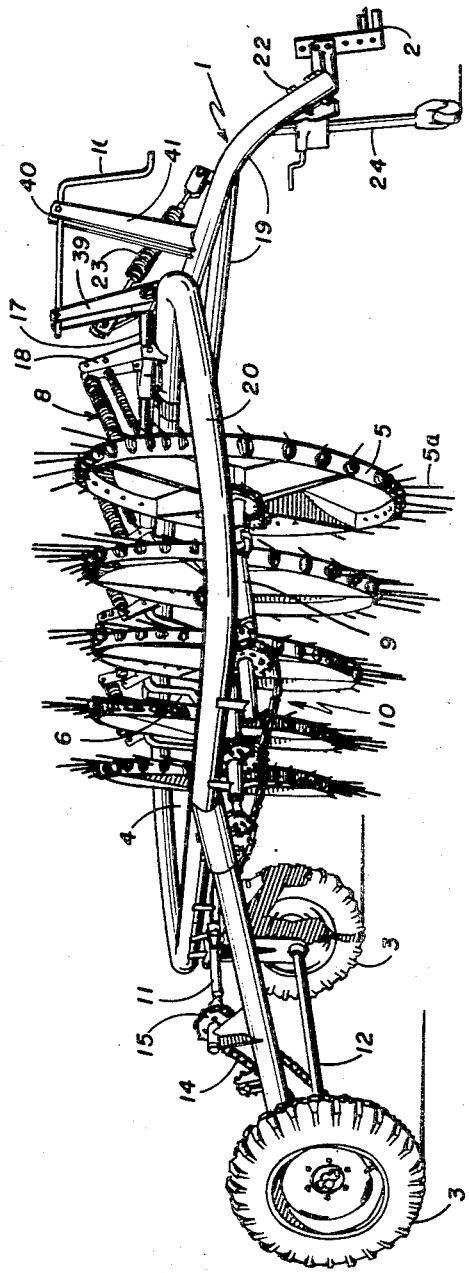

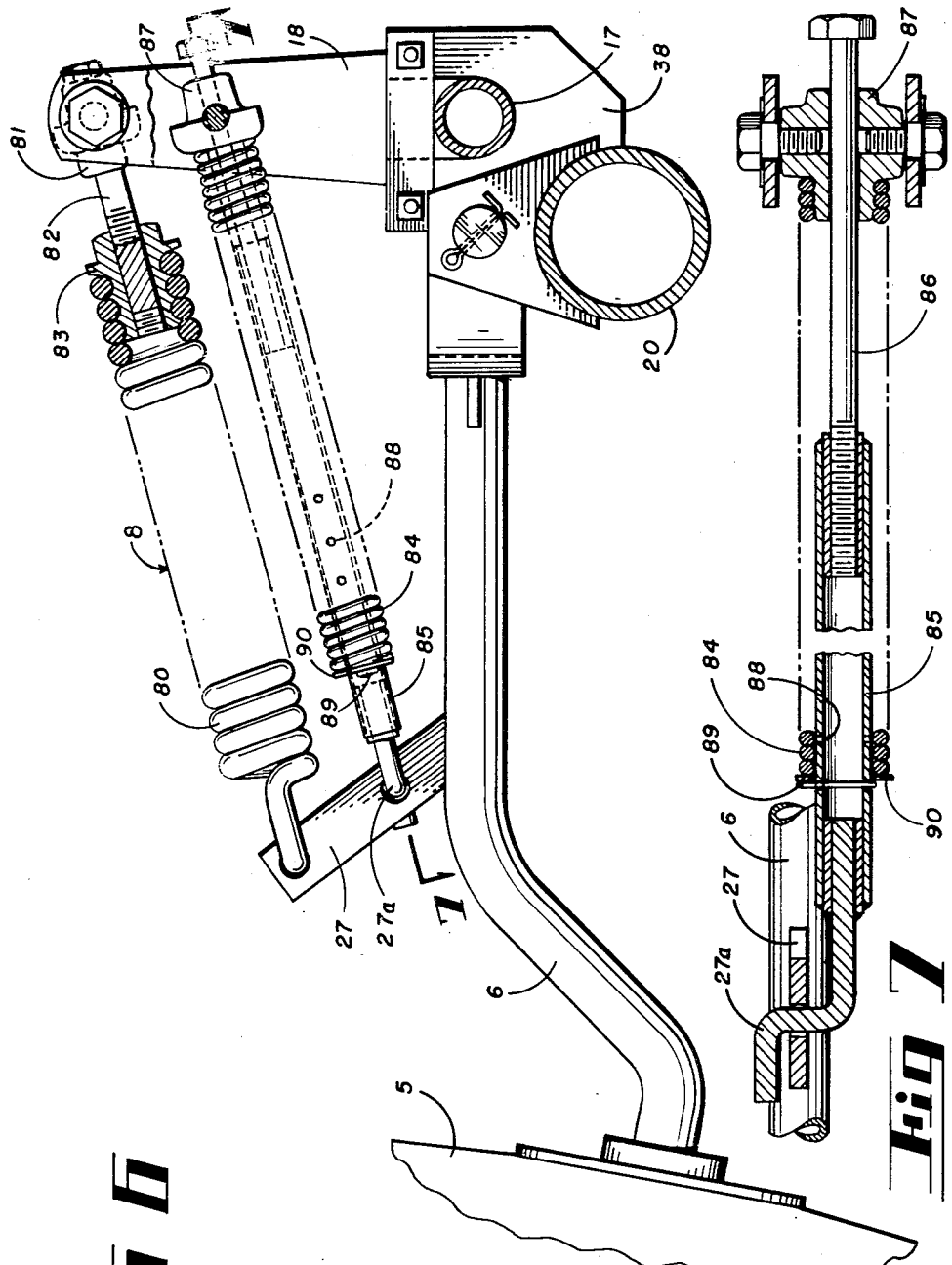

United States Patent Office 2,827,754
Patented Mar. 25, 1958

2,827,754

ROTARY RAKE WHEEL SIDE DELIVERY RAKE WITH A POSITIVE DRIVE THEREFOR

George B. Hill, Celina, Ohio, assignor to Avco Manufacturing Corporation, Cincinnati, Ohio, a corporation of Delaware Application May 11, 1954, Serial No. 428,922

2 Claims. (Cl. 56—377)

The present invention relates to agricultural equipment and, more particularly, to a side delivery hay rake.

More specifically, the invention concerns that type of rake which includes a plurality of rotary, overlapped diagonally disposed raking wheels which are supported by a mobile frame. As the frame traverses a field of mowed hay, the raking wheels gather the hay and deliver it in a windrow at one side of the path of travel of the implement.

Numerous patents have issued in the field to which the present invention broadly relates. Two patents worthy of note are the British Bamford Patents 16,135 and 26,246 which issued in 1901 and 1902, respectively. A further patent of interest is the British Blackstone et al. Patent 109,094 which issued in 1917.

By reference to the before-mentioned patents, some understanding can be gained of the field in which the present invention represents an improvement of importance.

Briefly stated, the present invention comprises a hay rake including a substantially horizontal frame supported at its front end by a tractor and at its rear by a pair of ground wheels. The frame defines an elongated open area within which inclined raking wheels are each individually and pivotally supported by the frame. The raking wheels are power driven, means being provided for transferring power from the ground wheels to a plurality of sprockets and chains which transfer power to telescopic universal connections attached to the raking wheels.

An important feature of the present invention is the inclination of each of the raking wheels in the direction of forward movement which produces markedly superior raking action.

Means is provided for individually and resiliently supporting each of the raking wheels so that they may rise and fall in response to the type of terrain traversed without damage and without impairment of effective raking action. Means is also provided for simultaneously raising and lowering the raking wheels in unison to facilitate adjustment of the rake for various types of field conditions, and further, to simplify transport of the rake.

In view of the foregoing, it will be appreciated that it is an object of the present invention to provide an improved rake having power driven raking wheels which are inclined in the direction of forward travel of the rake.

From a functional standpoint, it is an object of the present invention to provide an improved rake that makes it possible to rake an even, fluffy windrow which facilitates air drying and curing of leaves and is easily picked up by a baler, forage harvester, or similar farm machine.

It is also an object of the present invention to provide an improved form of raking wheel suspension and power drive connection whereby the raking wheel may be resiliently suspended for light ground contact and continuously driven to produce superior raking action independent of its forward motion.

Another object of the invention is to provide simplified means for simultaneously effecting adjustment of a plurality of overlapped power driven raking wheels.

A still further object of the invention is the provision of a novel resilient drive for transferring power to a raking wheel.

Another object of the invention is the provision of an improved frame having ample ground clearance at its front for avoiding interference with a crop being raked by the raking wheels supported by the frame.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

Figure 1 is a top plan view of the improved rake disclosing the tubular frame thereof and a plurality of power-driven, overlapped raking wheels which are diagonally disposed to the line of travel of the rake, parts being broken away as required to clarify the illustration;

Figure 2 is a fragmentary vertical sectional view through the rake taken on plane 2—2 of Figure 1 showing the resilient suspension and power driving connections for an individual raking wheel;

Figure 3 discloses a modified form of drive for the raking wheels, parts being broken away as required to clarify the illustration;

Figure 4 is a fragmentary cross sectional view to an enlarged scale taken through the hub of a raking wheel on plane 4—4 as indicated in Figure 2;

Figure 5 is a side elevational view of the assembled rake with the raking wheels in substantially the position assumed during normal use and operation;

Figure 6 is a fragmentary side elevational view drawn to an enlarged scale showing the details of the resilient support for a raking wheel as viewed on plane 6—6 of Figure 1; and Figure 7 is a longitudinal sectional view taken on plane 7—7 of Figure 6 through the compression spring of the resilient wheel support.

General organization

With particular reference to Figures 1 and 5, it will be noted that the present invention comprises a substantially horizontal tubular frame, generally designated 1, having at its front end a draft connection 2 for attachment to the draw bar of a tractor (not shown) and supported at its rear by a pair of ground wheels 3. The central portion of the frame defines an elongated open area 4 in which a plurality of overlapped raking wheels 5, bearing peripheral spring tines 5a, are resiliently and individually supported by associated arms 6. The support arms are pivotally secured to the forward portion of the frame, as indicated at 7, each raking wheel being resiliently supported by a spring suspension system, generally designated 8. The exact details of the wheel supports will be more fully described later in the specification.

It will be noted, particularly with reference to Figure 1, that the raking wheels are overlapped and extend diagonally with reference to the line of travel of the rake, which is towards the right in Figure 1, since the rake is a draft type implement. The rake is designed to engage a swath of previously mowed hay or similar material and to rake it and roll it into a windrow at the left of the path of travel.

Each of the raking wheels is power driven through a telescopic universal connection, indicated at 9 in Figures 1 and 5. The universal connections receive power through associated sprockets and chains, generally designated 10, which in turn are driven through telescopic connection 11 by the ground wheels 3. These ground wheels are secured to a transverse shaft 12 to which is secured for conjoint rotation a sprocket 13 engaging chain 14 which delivers power in turn to sprocket 15 which is associated with the telescopic connection 11.

Since the raking wheels are power driven, rotation of the wheels is not dependent upon ground contact, and by means of the resilient suspension the wheels may be delicately adjusted for optimum raking qualities without danger of damage to the raking wheels from impact with the ground.

As illustrated in Figures 1, 2, and 5, a manually operated crank 16 is provided for imparting limited rotation to a transverse shaft 17 to which a plurality of spring supports 18 are secured for supporting the forward ends of spring suspension system 8. Through operation of crank 16, the spring supports may be moved simultaneously to raise or lower the raking wheels in unison. In this way, simultaneous adjustment of the raking wheels may be effected or the raking wheels may be raised to a relatively high level away from ground engagement to facilitate transport of the rake from one field to another.

*Frame construction and raking wheel suspension*

As indicated in Figure 1, the frame includes a pair of forwardly and downwardly extending tubular members 19 which are rigidly attached to the main portion 20 of the frame, as indicated at 21. Tubular members 19 are joined together at 22 to form vertically adjustable draft connection 2 by means of which the rake may be readily attached to the draw bar of a conventional tractor. To facilitate vertical adjustment of the draft connection and attachment to the tractor, a jack 24 is integrally secured to the forward part of the rake.

To the forward part of frame portion 20 there is secured a pair of upright ears 25 opposite each of the raking wheels (see Figure 1). Each wheel support arm 6 is secured to a clevis 26 which is pivotally secured to ears 25, as indicated at 7 in Figures 1 and 2.

As illustrated in Figure 4, each arm 6 extends through and rotatably supports a raking wheel 5 which comprises a conoidal sheet metal front face 28 and a small circular rear face 29 between which a tubular sleeve 30 is integrally secured. A pair of bushings 31 are force-fitted within sleeve 30 and serve as bearings for supporting the raking wheel on arm 6.

To the rear of each arm 6 there is attached a sprocket support bracket, generally designated 32. Boss 35 of the bracket is keyed and pinned, as indicated at 33 and 34, respectively, to the rear end of support arm 6. Thus, the bracket is rigidly attached to, and moves conjointly with, its support arm at all times. Each raking wheel is confined axially by a boss 35 and a collar 36 formed on the associated arm 6. To facilitate adjustment of axial clearances, a shim 37 may be provided between boss 35 and the rear of the raking wheel.

With further reference to Figures 2 and 6 showing the type of support used for each raking wheel, it will be noted that a lug 27 is secured to each wheel support arm 6 and that the wheel supporting springs of suspension system 8 are positioned between these lugs and the associated spring supports 18. The upper spring of each pair, individually designated 80, is a tension spring having one end pivotally engaged with lug 27 and the other end secured to spring supports 18 through pivoted anchor member 81 and bolt 82. It will be noted that bolt 82 passes loosely through member 81 into threaded engagement with casting 83 which is engaged with spring 80. Through adjustment of this bolt the tension of spring 80 may be regulated as desired.

Lower spring 84, which in each set is a compression spring, surrounds a guide rod 85, one end of which is pivotally engaged with lug 27, as indicated at 27a. Threadedly engaged with the guide rod is a bolt 86 which is slidably engaged with guide member 87, also pivotally secured to spring supports 18.

It will be noted that a series of holes 88 is provided in the guide rod for receiving a cotter key 89. Spring 84 bears at one end on washer 90, the position of which is determined by the cotter key and provides a simple and effective means for adjusting the compressive load of spring 84 exerted on the washer and on the guide member 87.

The head of bolt 86, which normally is spaced slightly from the guide member to permit limited wheel movement in response to ground contour, comes into bearing engagement with guide member 87 whenever the raking wheel drops more than a predetermined amount, acting as a positive stop determining the maximum downward movement of the raking wheel. It is also to be noted that when spring supports 18 are rotated clockwise, as viewed in Figures 2 and 6, guide members 87 are brought into bearing engagement with the heads of bolts 86 transferring through these bolts the forces for lifting the raking wheels.

Desirably, the raking wheels are adjusted to make light ground contact, the springs 80 bearing the weight of the raking wheels and yieldably opposing downward movement of the raking wheels. Should a raking wheel strike an obstacle, the force acting against the raking wheel, combined with the load of the associated tension spring 80, naturally tends to raise the raking wheel over the obstruction. As the wheel rises, load is applied to the associated compression spring 84 which gradually resists the upward movement of the wheel and yieldably limits it and prevents needless over-travel. Thus, the combined effect of the springs is to permit light ground contact of the raking wheels while preventing bouncing or uncontrolled oscillation of the wheels.

During certain raking operations, it may be found desirable to increase the initial compressive load of springs 84 so that any tendency of the raking wheels to rise is rapidly opposed. Such adjustment of the springs may be resorted to while raking a heavy crop which might otherwise tend to force the raking wheels away from the ground surface.

As has been mentioned, the spring supports 18 for each raking wheel are rigidly secured in upright position to a transverse shaft 17 which, in turn, is rotatably supported by a plurality of bearing plates 38 welded to the front of frame portion 20. Near one end of shaft 17 are secured upright levers 39 which pivotally support a block 40 threadedly engaged by the hand crank 16. The forward portion of the hand crank is supported by bracket 41 which is rigidly secured to one of the forward frame members 19. A counterbalancing spring 23 is anchored to the frame and applies a torque to shaft 17 counterbalancing the weight of the raking wheels. As crank 16 is turned, levers 39 are moved back and forth imparting limited rotation to shaft 17 which, in turn, imparts corresponding rotation to spring supports 18, thereby shifting the spring suspension system 8 which resiliently support the raking wheels. As will be understood from a study of Figure 2, clockwise movement of levers 39 raises the raking wheels, whereas counterclockwise movement lowers the raking wheels into ground engagement.

It is interesting to note that while each raking wheel is individually and resiliently supported, the raking wheels can be adjusted vertically in unison merely through the manipulation of crank 16. Similarly, through use of the hand crank, all of the raking wheels may be raised out of ground engagement to facilitate transportation.

*Power drive for raking wheels*

As has been explained, the power for driving the raking wheels is derived from the ground wheels 3 which deliver energy to the telescopic connection 11. As illustrated in Figure 1, power is delivered by connection 11 to a short horizontal shaft 42 to which is secured a pair of sprockets 43. One of the sprockets engages chain 44 while the other sprocket engages chain 45, these chains driving sprockets 46 and 47, respectively.

It will be noted that sprocket 46 is secured to another short horizontal shaft 48. Sprocket 47 and a similar sprocket 49 are both secured to another short horizontal shaft 50.

Sprocket 49 drives chain 51 which is engaged with sprocket 52 attached to shaft 53. Another sprocket 54 is also attached to this same shaft and drives chain 55 which in turn is engaged with and drives sprocket 56 mounted on shaft 57.

All of the shafts 42, 48, 50, 53, and 57 are rotatably secured beneath tubular frame portion 20 (see Figures 1 and 2).

It will be understood by those skilled in the art that a sheet metal cover shield may be provided over the sprockets and shafts attached to the rear of frame portion 20. Such a shield has been omitted in order to simplify the illustration, but such a shield obviously can be provided to keep hay and other foreign matter out of the driving elements.

It should also be noted that a plurality of idlers 58 have been provided to adjust the tension of drive chains 44, 45, 51, and 55. These idler sprockets may be of conventional construction. A typical idler sprocket and its mounting are illustrated in Figure 3 of the Vutz et al. Patent 2,704,670 which issued March 22, 1955 on a Removable Manure Spreader Distributor.

The mechanism for delivering the power directly to the raking wheels may now be considered.

Turning to Figure 4, it will be noted that each sprocket support bracket 32 includes a cylindrical bearing 59 which rotatably supports shaft 60 to one end of which is attached sprocket 61, clevis 62 being secured to the other end of the shaft for pivotal attachment to its corresponding telescopic connection 9. As illustrated in Figure 1, each raking wheel is provided with such a telescopic connection attached to its associated shaft 42, 48, 50, 53, or 57.

Thus, power for each raking wheel is delivered to a sprocket 61 which engages a chain 63 which drives a sprocket 64 bolted, as at 65, to the rear face 29 of the raking wheel. It will be noted that a clearance hole 66 is provided in sprocket 64 to permit rotation of the raking wheel and sprocket without interference with boss 35.

To facilitate adjustment of the tension of chain 63, bracket 32 may be made in sections which are bolted together, as indicated at 67. A plurality of equally spaced holes may be provided in the bracket sections to receive bolts 67 after the sections have been adjusted as required.

From a study of Figure 1, it will be understood that all of the power for the raking wheels is delivered through the telescopic connection 11 and distributed through the various sprockets and chains to each of the raking wheels, all of which rotate in the same direction, which is counterclockwise, as viewed from the front of the implement.

In review, it will be appreciated that not only is each raking wheel individually suspended and power-driven, but that the raking wheels may swing arcuately about pivots 7 to accommodate the nature of the terrain encountered. During such arcuate movement, the raking wheels are continuously power driven by virtue of the telescopic connections 9. Thus, it will be noted that the raking wheels are not adjusted in vertical planes but shift arcuately and readily rise to avoid any ground obstructions that may be encountered. This is a particular advantage of suspending the raking wheels from the forward part of the frame rather than from the rear of the frame in which event the wheels would tend to dig into the ground when obstructions were encountered.

Attention is now called to Figure 3 which shows a modified and simplified means for driving the raking wheels.

As illustrated in this figure, a short shaft 42a is secured beneath frame 20. To the shaft there is attached sprockets 43a serving the same purpose as do sprockets 43 illustrated in Figure 1. On shaft 42a is integrally formed a spring connection 42b to which one end of a heavy coil spring 42c is anchored. The other end of the spring is anchored to spring connection 60a formed on shaft 60b to which is also secured a sprocket 61a comparable in structure and function to sprocket 61. The raking wheel is driven from sprocket 61a in the same way that sprocket 61 drives the raking wheel illustrated in Figure 4.

It will be noted that by virtue of coil spring 42c power may be transferred from the relatively fixed shaft 42a to shaft 60b. The spring is quite flexible and readily accommodates shifting movements of the raking wheel. On the other hand, the spring is simple and inexpensive and eliminates the need for a more costly telescopic connection, such as indicated at 9. The coil spring will also accommodate minor variations in the rate of raking wheel rotation resulting from momentary overloads. Should rotation of the raking wheel be momentarily retarded, a limited amount of wind-up of spring 42c may occur without damage to the rest of the rake. When the raking wheel is freed, this wind-up is released and normal operation resumed.

*Raking wheel inclination*

A cardinal feature of the present invention is the inclination of each of the raking wheels in its direction of forward travel. This is illustrated particularly well in Figure 2 which discloses the forward face of the raking wheel disposed at a 74° angle A with the horizontal. Since the forward face of the raking wheel is conoidal, the plane of raking wheel rotation, in which lie tines 5a, defines a somewhat larger angle B with the horizontal which, as illustrated, is approximately 80°. From actual experiments with a rake of the type disclosed, it has been found that optimum performance can be attained when the plane of raking wheel rotation makes an 80° angle with the ground, although some latitude of design is permissible employing smaller and larger angles. For satisfactory operation, the tines per se need not necessarily lie in the plane of rotation.

The angular disposition of the raking wheels inclined in the direction of travel tends to roll the hay into a light, open, fluffy windrow which facilitates drying of the leaves and minimizes crushing and loss of the leaves which contain a large percentage of the crop's nutrients. The raking action attained with inclined raking wheels has been found to be remarkably superior to that which can be attained when the raking wheels are erect. Erect wheels merely scrape the hay aside as the rake passes without forming a well defined windrow. Formation of a light hollow windrow is also favored through the conical formation of the front face of the raking wheels. Thus, as illustrated in Figure 2, the effective angle with the ground can be reduced to 74° without necessitating a large deviation of the axis of rotation of the raking wheels from the horizontal.

As a secondary means of adjustment, the height of the frame 1, relative to draft connection 2, may be varied. The angle between the raking wheels and the ground is reduced as frame 1 is lowered on connection 2.

With particular reference to Figure 5, it will be noted that the leading section of frame portion 20 is elevated slightly to prevent interference with the windrow being formed by the raking wheels. The offset configuration of wheel support arms 6 is commensurate with the relatively raised position of the leading section of the frame portion and positions the axes of rotation of the raking wheels at a lower level.

From the foregoing description of the invention, it will be appreciated that a novel side delivery rake has been provided and one which combines the advantages of power drive with inclined raking wheels which are adapted to form efficiently a light open fluffy windrow at the side of the path of implement travel.

Having described my invention, I claim:

1. In a side delivery rake designed to be pulled by a tractor, a horizontally arranged frame attached at its front to the tractor, ground wheels supporting the rear of said frame, a plurality of overlapped staggered rotary raking wheels each angularly disposed to the direction of travel of said frame, a support arm for each raking wheel pivotally secured to said frame in advance of said raking wheel, each of said support arms being arranged for pivotal movement about a substantially horizontal transverse axis, a transverse shaft pivotally secured to said frame in advance of said raking wheels, resilient spring means extending between said shaft and said raking wheel support arms, members connected for imparting rotation to said shaft whereby said raking wheels may be simultaneously raised and lowered about their individual pivotal axes of support, a sprocket support bracket secured to each raking wheel support arm behind its associated raking wheel, a sprocket secured to the rear side of each raking wheel, a second sprocket rotatably supported by each of said sprocket support brackets, a plurality of shafts rotatably supported by said frame at the rear of said raking wheels, rotary driving elements connected to rotate said raking wheels through said sprockets for transferring power from said ground wheels to said shafts, and universal joints connecting said shafts and said second sprockets supported by said sprocket support brackets, and connectors for transferring power from said second to said first sprocket of each raking wheel.

2. Apparatus as defined in claim 1 in which each of said raking wheels is inclined at its top in the direction of rake travel.

References Cited in the file of this patent

UNITED STATES PATENTS

| | | |
|---|---|---|
| Re. 23,411 | Stenzel | Sept. 11, 1951 |
| 468,382 | Beck | Feb. 9, 1892 |
| 2,459,961 | Pollard | Jan. 25, 1949 |
| 2,532,652 | Wray | Dec. 5, 1950 |
| 2,657,519 | Hill | Nov. 3, 1953 |
| 2,672,005 | Hamilton | Mar. 16, 1954 |
| 2,712,723 | Ryan | July 12, 1955 |